United States Patent [19]

Jackson

[11] 4,034,193

[45] July 5, 1977

[54] ELECTRONIC ACCESS CONTROL SYSTEM

[75] Inventor: James J. Jackson, Westbrook, Conn.

[73] Assignee: Veeder Industries, Inc., Hartford, Conn.

[22] Filed: Aug. 21, 1975

[21] Appl. No.: 606,416

[52] U.S. Cl. .............................. 235/151.34; 222/36
[51] Int. Cl.² ...................... G06F 15/24; B67D 5/14
[58] Field of Search ................ 235/151.34, 61.7 R, 235/61.7 A, 61.7 B; 222/2, 30, 36, 23, 26, 52; 194/4 C; 340/172.5

[56] References Cited

UNITED STATES PATENTS

| 3,312,372 | 4/1967 | Cooper, Jr. ........................ 222/2 |
| 3,484,020 | 12/1969 | Houle et al. ...................... 222/30 X |
| 3,498,501 | 3/1970 | Robbins et a. ................... 222/30 X |
| 3,697,729 | 10/1972 | Edwards et al. ................... 222/2 X |
| 3,786,421 | 1/1974 | Wostl et al. ............... 235/61.7 B X |
| 3,821,537 | 6/1974 | O'Keefe .................... 235/151.34 X |
| 3,891,830 | 6/1975 | Goldman ........................ 222/2 X |
| 3,895,738 | 7/1975 | Buchanan et al. ........ 235/151.34 X |
| 3,931,497 | 1/1976 | Gentile et al. .............. 235/61.7 B |
| 3,935,435 | 1/1976 | Greenwood ................. 235/151.34 |

Primary Examiner—Edward J. Wise
Attorney, Agent, or Firm—Prutzman, Hayes, Kalb & Chilton

[57] ABSTRACT

A fuel dispensing system having seven separate fuel pumps for dispensing fuel, a pump activation system permitting each of eight hundred authorized users to individually activate a fuel pump he is authorized to use and having a keyboard for user selection of an inactive pump and user entry of an assigned unique nine-digit identification number, digit by digit in descending order sequence, for activating the selected pump. Entry controls and a RAM are provided for validating the identification number and for activating the selected pump if the identification number is correct and an authorized pump is selected and for totalizing the amount of fuel dispensed by each user, and a main console is provided for selectively setting and reading each user's identification number and pump authorization code and for selectively reading the total amount of fuel dispensed by each user and resetting the total to zero.

32 Claims, 5 Drawing Figures

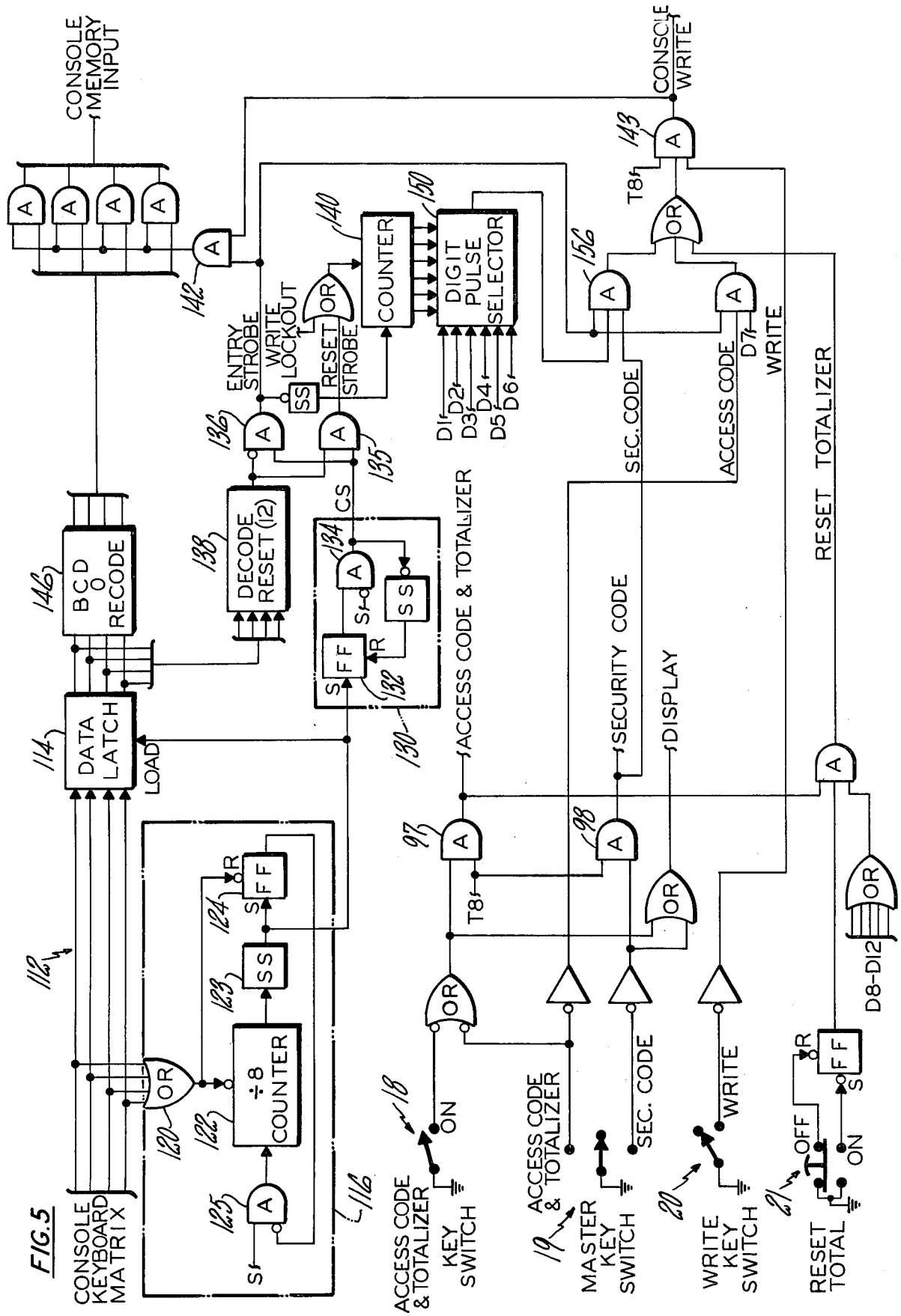

ELECTRONIC ACCESS CONTROL SYSTEM

BRIEF SUMMARY OF THE INVENTION

The present invention relates to a multiple user access system useful by each of a plurality of authorized users for gaining access to associated apparatus and having notable utility with fuel dispensing apparatus for self-service delivery of fuel by each of a plurality of authorized users and for accounting for the amount of fuel dispensed by each such user.

It is a primary aim of the present invention to provide a new and improved multiple user access system for fuel dispensing apparatus for the self-service dispensing of fuel by a relatively large number of authorized users (e.g., fifty to eight hundred authorized users) and for accounting for the amount of fuel dispensed by each user.

It is another aim of the present invention to provide a new and improved keyboard operated access system having a keyboard entry identification system for permitting authorized user access to associated apparatus. In accordance with the present invention, each authorized user is assigned a unique multiple digit identifier (e.g., having nine number digits) which enables the user to gain access to associated apparatus by entering his multiple digit identifier, digit by digit in sequence, into the identification system with an entry keyboard.

It is another aim of the present invention to provide a new and improved dispensing apparatus access control and accounting system having utility with conventional fuel delivery pumps.

It is a further aim of the present invention to provide a new and improved fuel dispensing apparatus access control and accounting system for accounting for the amount of fuel dispensed by each of a relatively large number of authorized users.

It is another aim of the present invention to provide a new and improved fuel dispensing apparatus access control and accounting system which is operable for accounting for the fuel dispensed from a plurality of fuel delivery pumps.

It is a further aim of the present invention to provide a new and improved fluid dispensing apparatus access control and accounting system of the type described which is operable for selectively registering the amount of fluid dispensed by each authorized user and registering a security code identifier assigned to each user for his use in gaining access to the fluid dispensing apparatus.

It is another aim of the present invention to provide a new and improved identifier operated access system for gaining access to associated apparatus. In accordance with the present invention, the access system is independently operable by each of a relatively large number of authorized users each having an assigned unique identifier, by user entry of his unique identifier into the system, with an entry keyboard in the preferred embodiment hereinafter described, or alternatively, for example with an appropriate identification card incorporating the user's unique identifier by inserting the identification card into a suitable card reader.

It is another aim of the present invention to provide a new and improved multiple user access control and accounting system for multiple station apparatus which provides concurrent and independent use of the apparatus stations by authorized users and for accounting for the use by each user.

It is another aim of the present invention to provide a new and improved multiple user access system for multiple station apparatus which provides for restricting each user's access to selected stations of the multiple station apparatus.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE DRAWINGS

In the drawings:

FIG. 5 is a diagrammatic representation of a main console entry and display control circuit of the access system.

DESCRIPTION OF THE PREFERRED EMBODIMENT

Figure 1:
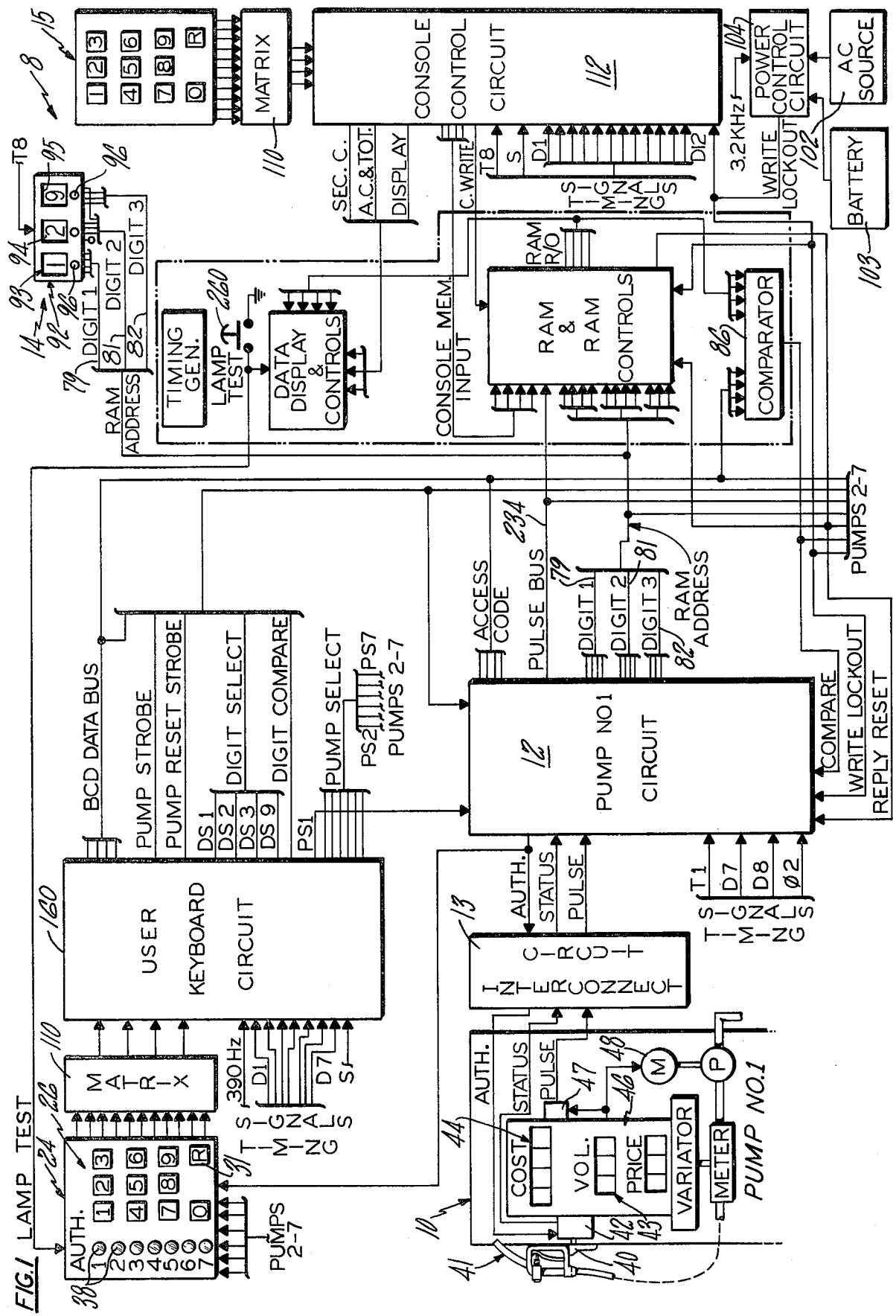
FIG. 1 is a partial diagrammatic representation, partly broken away, of a multiple pump fuel delivery system incorporating a preferred embodiment of a multiple user access system of the present invention.

Referring now to the drawings in detail, wherein like numerals designate like parts, a multiple user access system 8 incorporating a preferred embodiment of the present invention is shown employed in a fuel dispensing system for controlling and accounting for the delivery of fuel from a plurality of generally conventional fuel pumps 10 by each of a large plurality of authorized users (i.e., up to 800 users). The shown access system 8 is usable with up to seven fuel pumps 10, but only one fuel pump (i.e., Pump No. 1) and its corresponding pump circuit 12 and interconnect circuit 13 are shown in FIG. 1 for simplicity.

The access system 8 comprises a main or control console 14 with a ten-button keyboard 15 (FIG. 1), a six-digit numeral display or readout register 16 (FIG. 4) and four manually operable control switches 18–21 (FIG. 5); and a user console 24 with a ten-button keyboard 26 for permitting authorized user access to a selected fuel pump of the fuel dispensing system for dispensing fuel. The main console 14, including its keyboard 15, display register 16 and manually operable controls 18–21, is preferably remotely located to permit main console operators to (a) conveniently read the accumulated amount of fuel delivered by each user and reset such amount to zero when desired; (b) insert into the system and read each user's unique six-digit security code number (assigned to each user and employed in a nine-digit user identification number used to gain access to the fuel dispensing system as hereinafter described); and (c) insert into the system and read each user's single digit access control code number (assigned to each user to control his authorized access to the dispensing system as hereinafter described).

The access system 8 has notable utility in providing for self-service delivery of fuel by each of a large plurality of authorized users (e.g., authorized vehicle operators in fleet operations or authorized credit customers)

and such that each authorized user can dispense fuel by proper entry of his unique nine-digit identifier into the system with the user keyboard 26. More particularly, in the preferred embodiment described herein, each authorized user is assigned a unique nine-digit identification number, and each user is free to make self-service deliveries by sequentially (a) resetting an entry control system of the access system by depressing a reset or "R" button 31 of the user keyboard 26; (b) selecting an inactive pump which he is authorized to use (as established by the user's assigned access control code number as hereinafter described) by depressing the keyboard number button 1–7 for the selected pump; and (c) entering his assigned nine-digit user identification number, digit by digit in descending order sequence, into the entry control system with the user keyboard 26. An authorization signal is then generated by the pump circuit 12 of the selected pump 10 and transmitted (a) via the pump interconnect circuit 13 to activate the selected pump 10 and (b) to the user console 24 to energize a corresponding pump authorization light 38 and thereby indicate the selected pump has been activated. The user can thereupon dispense fuel with the selected pump and another user can dispense fuel concurrently therewith from another pump by activating the pump in the same manner by sequentially depressing the reset button 31, depressing the number button for the selected pump and entering his unique nine-digit identification number into the system.

In a conventional manner, each pump 10 has an operating handle 40 mounted adjacent the usual fuel delivery nozzle receptacle so that the handle 40 must be placed in its vertical or "off" position before the delivery nozzle 41 can be returned to its receptacle at the end of a fuel delivery and so that the handle 40 cannot be moved to its horizontal or "on" position until after the nozzle 41 is removed from its storage receptacle. A "status" signal is transmitted from the pump 10 via the pump interconnect circuit 13 to the respective pump circuit 12 when the handle is in its horizontal or "on" position to signal that the pump is in use. Upon pump activation with the authorization signal, power is supplied to an electric reset 42 of the selected pump so that when the handle 40 is subsequently placed in its "on" or horizontal position, the electric reset 42 is energized to reset the usual volume and cost registers 43, 44 of the pump computer 46. After the registers 43, 44 are reset to zero, power is supplied to the fuel delivery pump motor 48 to condition the pump 10 for dispensing fuel.

Each pump 10 has a suitable pulse generator 47 for transmitting a train of speed cost or volume pulses via the pump interconnect circuit 13 (which provides for establishing an appropriate pulse width) to the pump circuit 12 while the pump 10 is dispensing fuel. The pulse generator 47 may be connected, as by suitable gearing (not shown) directly to the lowest order cost or volume number wheel of the volume or cost register 43, 44 respectively to generate a pulse, preferably initiated at the one-half point, for each one-tenth of a unit volume amount of fuel dispensed (e.g., one-tenth of a gallon), or for each unit cost amount of fuel dispensed (e.g., one cent). The pulse generator 47 is preferably mounted to be reset with the registers 43, 44 so that the pulse timing remains accurate.

At the completion of a fuel delivery when the handle 40 is returned to its vertical or "off" position, the fuel delivery pump motor 48 is de-energized and the "status" signal transmitted to the pump circuit 12 is de-energized to signal that the pump is no longer in use. The pump circuit 12 thereupon de-energizes the respective authorization signal to deactivate the pump and de-energize the corresponding pump authorization light 38 at the user console 24.

Figure 4:
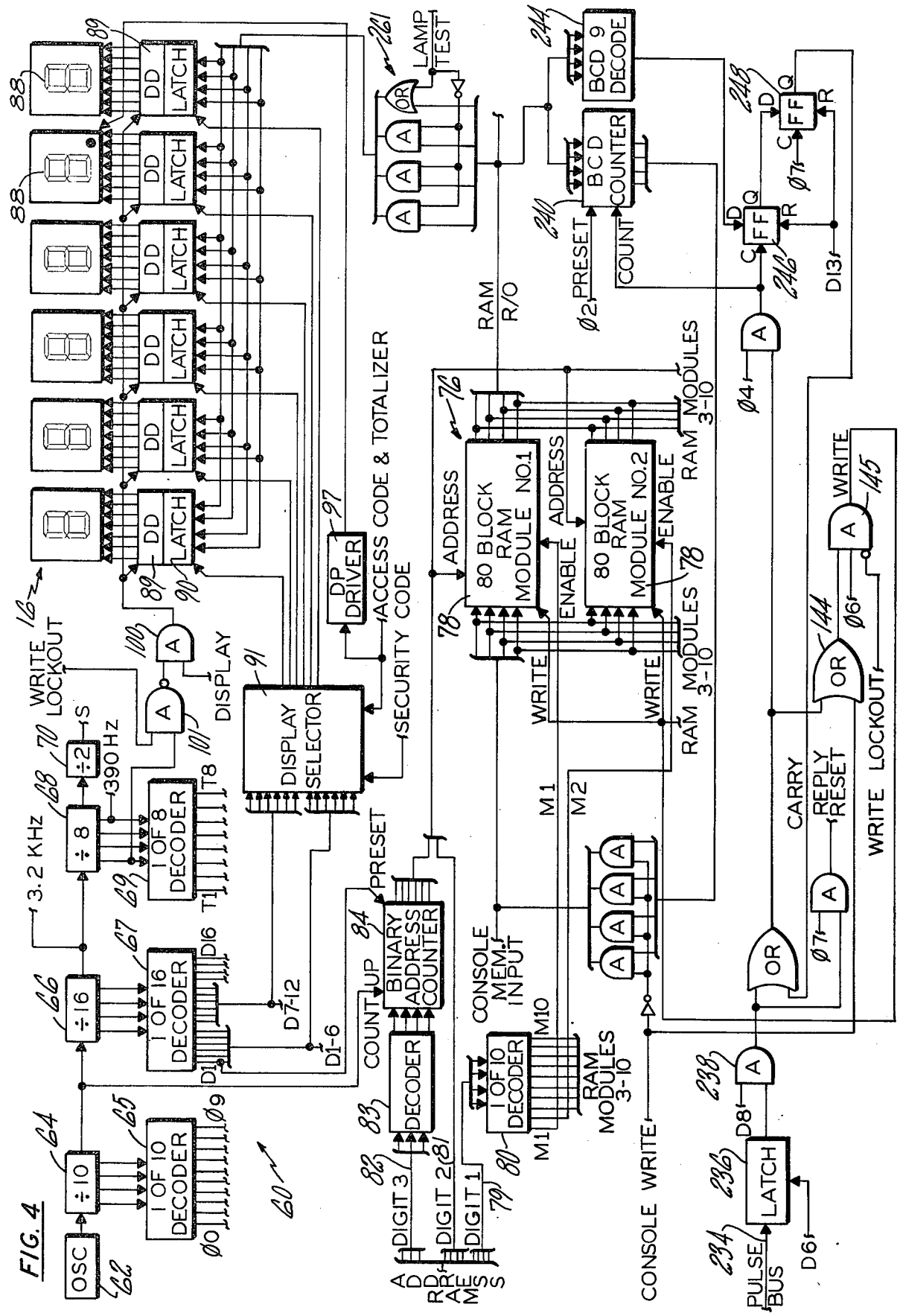
FIG. 4 is a diagrammatic representation showing a main console display and memory circuit of the access system.

Referring to FIG. 4, the access system 8 comprises a timing generator 60 for sequentially generating individual timing signals for strobing, coordinating and synchronizing the various logic processing functions of the system. Specifically, the timing circuit 60 comprises a 500 kHz oscillator 62 which steps a first stage ten-step binary ring counter 64 for repetitively generating a sequence of ten timing signals $\phi 0$ through $\phi 9$ in corresponding output leads of a binary decoder 65. The ring counter 64 is connected for stepping a second stage sixteen-step binary ring counter 66 for repetitively generating a sequence of sixteen-digit strobe signals D1 through D16 in corresponding output leads of a binary decoder 67. Similarly, the second stage ring counter 66 is connected for stepping a third stage eight-step binary ring counter 68 for repetitively generating a sequence of eight station strobe signals T1–T8 in corresponding output leads of a binary decoder 69. The station strobe signals T1–T7 are employed for sequentially selecting the seven delivery pump stations respectively, and the T8 station strobe signal is employed for selecting the main console station. The binary 4 signal from the binary counter 68 is also used as a 390 Hz signal input to a reset strobe control gate 178, the output signal from the binary counter 66 is used as a 3.2 kHz signal input to a power control circuit 104 (FIG. 1) and the third stage counter 68 is connected for stepping a two-step ring counter 70 for generating alternate cycle strobe signal designated "S" used as described hereinafter. Thus, during each cycle strobe signal S (and also during each alternate timing cycle $\overline{S}$ between strobe signals S), the eight station strobe signals T1–T8 are generated in sequence; and during each station strobe signal T1–T8, the sixteen-digit strobe signals D1–D16 are generated in sequence; and during each digit strobe signal D1–D16, the ten timing signals $\phi 0$–$\phi 9$ are generated in sequence.

A BCD random access memory or RAM 76, having up to ten separate BCD RAM modules 78 connected in parallel, is provided for storing the BCD data for each authorized user in a twelve decade or digit storage block of the RAM assigned to the user. The number of RAM modules 78 employed is established in accordance with the expected or desired number of authorized users. For facilitating addressing the RAM 76, each RAM module 78 is suitably divided into sixteen banks of five user storage blocks, providing a total of eighty data storage blocks.

The first six BCD storage decades or digits of each user storage block are employed for storing a unique six-digit security code number assigned to the respective authorized user (and which provides the last six digits of the nine-digit user identification number used for obtaining access to the system for dispensing fuel). The seventh BCD storage decade or digit of each user storage block is employed for storing the single digit access control code number assigned to the user for establishing which fuel pumps 10 the user may employ for dispensing fuel. For example, if seven fuel pumps are employed for dispensing three separate grades of gasoline (with two of the pumps dispensing "Regular" fuel, two of the pumps dispensing "High Test" fuel and the remaining three pumps dispensing non-leaded fuel), an access control code number of 1 can be assigned to a user and stored in the seventh BCD storage decade of the user storage block for permitting access only to the "Regular" fuel pumps; an access control code number of 2 can be used for permitting access only to the "High Test" fuel pumps; and an access control code number of 3 can be used for permitting access only to the non-leaded fuel pumps. Alternatively, the access control code number can be used to limit each user's access to a particular pump or pumps 10 irrespective of the fuel grades dispensed, where, for example, the pumps are at separate locations or where it was desired to segregate authorized user access for accountability reasons.

The last five BCD storage decades or digits of each user storage block are employed as a totalizer or accumulator for accumulating the cost amount or volume amount (depending upon how the pulse generators 47 are driven) of fuel delivered by the respective user.

An eleven-lead binary address is employed for addressing the RAM 76 to individually select each user storage block. A first four-lead binary address portion is transmitted via a "Digit 1" input 79 to a suitable binary decoder 80 for individually selecting or enabling the RAM modules 78. A second four-lead binary address portion is transmitted via a "Digit 2" input 81 for individually selecting the sixteen banks of user storage blocks of the selected RAM module; and a third three-lead binary address portion is transmitted via a "Digit 3" input 82 (and via a suitable decoder 83 and presettable binary address counter 84 hereinafter described) for individually selecting the five user storage blocks of the selected bank of storage blocks. The address counter 84 has a six-lead output for individually addressing the sixty storage decades of the five storage blocks of the selected bank of storage blocks, and the "Digit 3" input 82 is decoded by the decoder 83 to preset the address counter 84 (at the beginning of D1 digit time) to address the first storage decade of the selected user storage block.

The eleven-lead RAM address is independently established during each station time interval T1-T8 for independently selecting a user storage block during each station time interval. The twelve BCD storage decades of the selected data storage block are then addressed by the presettable address counter 84 in sequence during the station time interval and in synchronism with the digit strobe signals D1-D12 respectively. Thus, the presettable address counter 84 is preset at the beginning of the D1 digit strobe signal to provide an initial address, established by the "Digit 3" binary address portion, for addressing the first BCD storage decade of the selected user storage block. The memory address counter 84 is thereafter indexed at the beginning of each subsequent digit strobe signal for sequentially addressing the eleven succeeding BCD storage decades of the selected user storage block in synchronism with the eleven succeeding D2-D12 digit strobe signals respectively. Accordingly, during each station time interval T1-T8, the twelve BCD storage decades of the selected user storage block (selected by the RAM address received from the corresponding station as hereinafter described) are addressed in synchronism with the digit strobe signals D1-D12 respectively.

The BCD output of the RAM 76 is connected to a comparator 86 (FIG. 1) for automatically comparing RAM data, specifically the BCD security code, stored in the first six digits of the selected user storage block, with the BCD data of the last six digits respectively entered by the user with the user keyboard 26. The BCD output of the RAM 76 is also connected to the six-digit data display register 16 for displaying the data stored in the user storage block addressed during station time interval T8 and as manually selected at the main console 14. The display register 16 has six seven-bar LED display indicators 88 and corresponding decoder drivers 89 and input storage latches 90. A display selector 91 is selectively operated (only during station time interval T8 as a result of the application of the station strobe signal T8 to the timing gates 97, 98 shown in FIG. 5) by a "Security Code" input for timely strobing the display storage latches 90 with digit strobe signals D1-D6 to display the six-digit user security code stored in the first six digits of the user storage block selected at the main console 14. The display selector 91 is alternatively selectively operable by an "Access Code & Totalizer" input (only during station time interval T8) for timely strobing the display storage latches 90 with digit strobe signals D7-D12 to display (in the first or highest order digit of the display register) the access control code number stored in the seventh digit of the selected user storage block and to display (in the last five or lower digits of the display register) the totalizer amount stored in the eighth through twelfth digits of the selected user storage block. Also, a decimal point driver 97 is operated (by the "Access Code & Totalizer" input) to provide an appropriate LED decimal indication for the totalizer readout (e.g., between the two lowest order digits of the display register 16 where the totalizer amount is accumulated and displayed in tenths of a gallon).

A "Display" input signal to the display register 16 is transmitted via an intensity control gate 100 (FIG. 4) for operating the display register 16 when either a master key operated switch 19 is key operated to either its "Access Code & Totalizer" position for displaying the selected access code and totalizer amounts, or to its "Security Code" position for displaying the selected security code, or when a separate key operated switch 18 is key operated to its "on" position for displaying the access code and totalizer amounts of the selected user storage block. The "Display" signal so generated is continuous and such that when a low power control gate 101 is closed, the display indicators will be operated continuously.

If the primary or AC power source 102 (FIG. 1) of the system fails for a predetermined time interval, a "Write Lockout" signal is generated by a suitable power control circuit 104 to reduce the power drain on a secondary or backup battery power source 103. In that event, the "Write Lockout" signal and the binary 1 output signal of the ring counter 68 function via the low power control gate 101 to operate the indicators 88 at one-half duty cycle to conserve battery power. Also, as described hereafter with reference to FIGS. 3 and 4, the "Write Lockout" signal is employed to (a) prevent entering data into the RAM 76 from either the main console 14 or from the pumps 10 (but the "Write Lockout" signal is suitably timed by the 3.2 kHz input to the power control circuit to avoid interrupting a data entry cycle) and (b) hold all the pumps 10 in an inactive status by holding their pump "Authorization" signals de-energized thereby further reducing the required power from the backup battery power source 103.

A manually settable address selector 92 (FIG. 1) is provided at the main console 14 for manually selecting each user storage block of the RAM 76. The address selector 92 comprises three BCD selector switches 93–95 strobed by the main console station strobe signal T8 for timely addressing the RAM 76. The BCD selector switches 93–95 may, for example, be BCD switches of the type shown and described in U.S. Pat. No. 3,445,636 of Joseph A. Richards entitled "Single Wheel Counter Circuit" and dated May 20, 1969 and having a number wheel providing a numerical readout of the BCD switch position and suitable means such as a push button 96 for selectively setting the switch and number wheel. The highest order BCD selector switch 93 is employed for providing the "Digit 1" address portion for selecting the memory module 78 as described, and the remaining two BCD selector switches 94, 95 are employed for providing the "Digit 2" and "Digit 3" address portions for individually selecting the eighty user storage blocks of the selected memory module 78. Thus, for example, if the system employs five memory modules 78, the selector switch 93 can be set at any number from 1 to 5 to individually select the five available memory modules 78. If ten modules 78 are employed to provide 800 user storage blocks, the tenth module is selected by setting the selector switch 93 at "0".

The selector switches 94, 95 can be set at any two-digit numeral setting from 01 to 80 to individually select the eighty user memory storage blocks of the selected module 78. Specifically, the intermediate order selector switch 94 is used as an octal switch and the binary 1, 2 and 4 outputs from the octal switch 94 are combined with the binary 1 output from the selector switch 95 to form the "Digit 2" address portion to individually select the sixteen banks of memory blocks of the selected memory module 78 as described. Thus, the four lead "Digit 2" address portion is provided by the settings of both selector switches 94, 95 to individually select the sixteen banks of data storage blocks. The remaining binary 2, 4 and 8 outputs of the lowest order selector switch 95 provide the "Digit 3" address portion for individually selecting the five user storage blocks of the selected bank of storage blocks as described.

Figure 3:
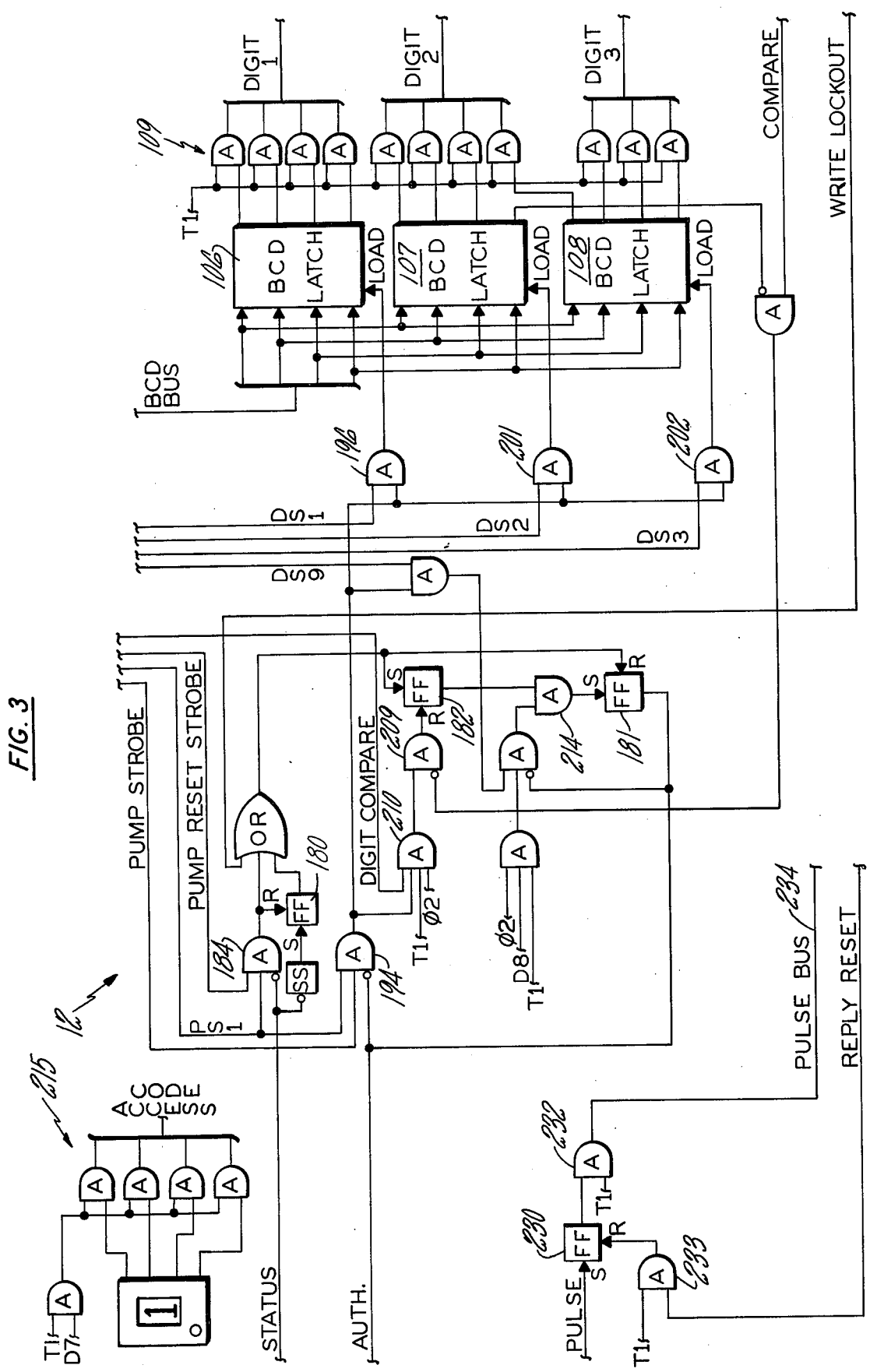
FIG. 3 is a diagrammatic representation of an individual fuel pump circuit of the access system.

Referring to FIG. 3 (which shows the pump circuit 12 for Pump No. 1 and which employs the corresponding T1 station strobe signal for timely operating the circuit logic functions as described hereinafter), each pump circuit 12 comprises three BCD storage latches 106, 107 and 108 (loaded as hereinafter described) for addressing the RAM 76 during the respective pump station time interval T1–T7. The binary outputs of the address latches 106–108 are connected (like the binary outputs of the main console selector switches 93–95) via an AND gate bank 109 to the eleven lead RAM address bus to timely address the RAM 76 during the corresponding station time interval T1–T7. Thus, the AND gate bank 109 of the Pump No. 1 circuit 12 is strobed by the T1 station strobe signal as shown in FIG. 3, and the AND gate banks 109 of the remaining pump circuits 12, now shown, are strobed by the respective station strobe signals T2–T7. A user storage block is thereby selected during each pump station time interval T1–T7 in exactly the same manner as the main console selector 92 selects a user storage block during the main console station time interval T8. If desired, six pumps or less could be provided, and a remaining available station time interval could be employed with a suitable interface system, for example, for addressing the RAM storage blocks and printing any desired stored data of the data storage blocks, selectively or automatically in sequence, or for sequentially transmitting any desired stored data of the data storage blocks, selectively or automatically in sequence, to a separate special or general purpose computer for any desired accounting purposes.

Referring to FIGS. 1 and 5, the ten push buttons or keys of the main console keyboard 15 are connected via a suitable encoding matrix 110 to transmit a binary encoded keyed input or entry signal to a console control circuit 112 in accordance with the push button actuated. The encoding matrix 110 provides a straight BCD signal for the 1–9 number buttons, a binary 12 signal for the reset button "R" and a binary 10 signal for the 0 number button. When a key is actuated, a binary data latch 114 is operated by a load or entry signal, after a very short but definite time delay established by a debounce circuit 116, to store the keyed binary entry signal into the data latch 114. The debounce circuit 116 is provided to avoid erroneous entry of data into the data latch 114 and employs an OR gate 120 to trigger the debounce circuit 116 when a key is depressed. A timing counter 122, connected to be stepped by the cycle strobe signal S, is thereupon released to be stepped eight steps and then pulse a suitable single shot 123 to generate the entry or load signal. The entry signal is also employed to set a flip-flop 124 to close an input control gate 125 for the stepping signal S. The timing counter 122 and flip-flop 124 are reset when the key is released and such that any short stray input signal operative to trigger the debounce circuit 116, but of insufficient duration to produce an entry signal, would not be entered into the system.

The load or entry signal generated by the single shot 123 is also applied to a strobe signal circuit 130 for producing a cycle strobe signal CS for strobing the entry circuit as hereinafter described. Specifically, the entry signal sets a flip-flop 132 and so that a succeeding alternate strobe signal $\overline{S}$ is transmitted via an AND gate 134 as a cycle strobe signal CS and then either via (a) an AND gate 135 to provide a reset cycle strobe signal or (b) and AND gate 136 to provide an entry cycle strobe signal. The reset cycle strobe signal is generated when a binary 12 is stored in the data latch 114 (as sensed by a binary 12 decoder 138), and an entry cycle strobe signal is generated when any other binary signal is stored in the data latch 114. When the reset button "R" is depressed, a reset cycle strobe signal is generated to reset a suitable digit select counter 140. Thereafter, as each 0–9 number button is depressed, an entry cycle strobe signal is generated to step the counter 140 (at the end of the entry strobe signal) so that the counter output signal in one of its six output leads corresponds to the digit position of the number key which is actuated. Also, each entry cycle strobe signal is applied to a data transmission control gate 142 for selectively transmitting the keyed entry data stored in the data latch 114 to the RAM 76 with a "Console Write" signal from a write control gate 143. A buffer matrix 146 is provided in the binary output from the binary data latch 114 to convert a straight binary 10 signal, employed to encode the 0 number button, to a conventional binary 0 signal.

More specifically, the digit select counter 140 is connected via a digit pulse selector 150 to provide a D1 to D6 digit pulse in the selector output in accordance with the digit position of the counter 140 and therefore in accordance with the digit position of the number key which is actuated. An AND gate 156 is connected to be operated by the entry strobe signal and the digit time signal from the selector 150 and so that a "Console Write" signal is produced during the proper D1–D6 digit time interval (of main console station time interval T8) when a master key operated switch 19 is placed in its "Security Code" position and a separate write key operated switch 20 is placed in its "Write" position.

As seen upon reference to FIG. 4, the "Console Write" signal is transmitted via an OR gate 144 and an AND gate 145 (during time $\phi6$ and as long as a "Write Lockout" signal is not present) to produce a "Write" signal for writing the keyed binary entry signal into the appropriate decade, corresponding to the digit position of the number key actuated, of the user storage block selected by the main console address selector 92. Thus, with the switches 19, 20 so positioned, a six-digit security code can be entered into the first six digits of the selected user storage block (selected with the address selector 92) by first operating the reset button "R" and then actuating the number keys for the desired security code, digit by digit in a descending order sequence. Also, with the master switch 19 in its "Access Code & Totalizer" position and the write switch 20 in its "Write" position, a single digit access control code is adapted to be entered into the seventh digit of the selected user storage block by merely actuating the appropriate number key. In that event, the "Console Write" signal is produced during the D7 time interval to enter the keyed number into the seventh digit of the selected user storage block.

Accordingly, with the master key operated switch 19 in its "Security Code" position and the write key operated switch 20 in its "Write" position, after the reset button R is depressed, and as the following six number keys are depressed in sequence, the D1–D6 digit pulses from the digit pulse selector 150 are transmitted as "Console Write" pulses for writing the keyed numbers into the corresponding first six decades of the RAM storage block selected by the main console address selector 92. A six-digit security code can thereby be entered into the first six storage digits of each user storage block of the RAM 76. The security code so entered thereupon becomes the security code assigned to that user storage block and the fourth through ninth digits of the user identification number for that storage block. Subsequently, the security code entered into each user storage block can be read by switching the master key operated console switch 19 to its "Security Code" position and selecting the appropriate user storage block with the address selector 92.

It can therefore be seen that a different or unique six-digit security code can be entered into each user storage block (for maximum protection against unauthorized self-service delivery of fuel). Alternatively, six-digit security code which are identical, in whole or in part, could be entered into some or all of the user storage blocks to facilitate access and/or to simplify the security arrangement. Also, the number of security code digits could be increased or decreased in accordance with the level of protection required, and if unauthorized use of the fuel pumps is not a problem in any particular installation, the security code validation system could be eliminated.

The three separate key operated switches 18, 19 and 20 are employed to provide separate levels of access at the main console. The separate key operated switch 18 is provided for obtaining with that key alone, very limited or low level access to the system for reading the access control code number stored in the seventh digit and the totalizer amount stored in the last five digits of the selected user storage block. The master key operated switch 19 may be used alone to read the established security code (with the master key 19 in its "Security Code" position) stored in the first six digits of the selected user storage block and to read the access code and totalizer amount (with the master key 19 in its "Access Code & Totalizer" position) stored in the last six digits of the selected user storage block. The separate key operated write switch 20 is required along with the master key switch 19 for writing (a) a security code number in the first six digits of the selected user storage block, or (b) an access control code number in the seventh digit of the selected user storage block. The write switch is also usable, with the master switch 19 in its "Access Code & Totalizer" position, and with a reset switch 21 to reset the totalizer or last five storage digits of the selected user storage block, it being seen that a binary 0 signal will be transmitted to the RAM 76 from the main console to reset the last five digits during digit intervals D8–D12 as long as a main console number key is not actuated to generate an entry strobe signal.

Figure 2:
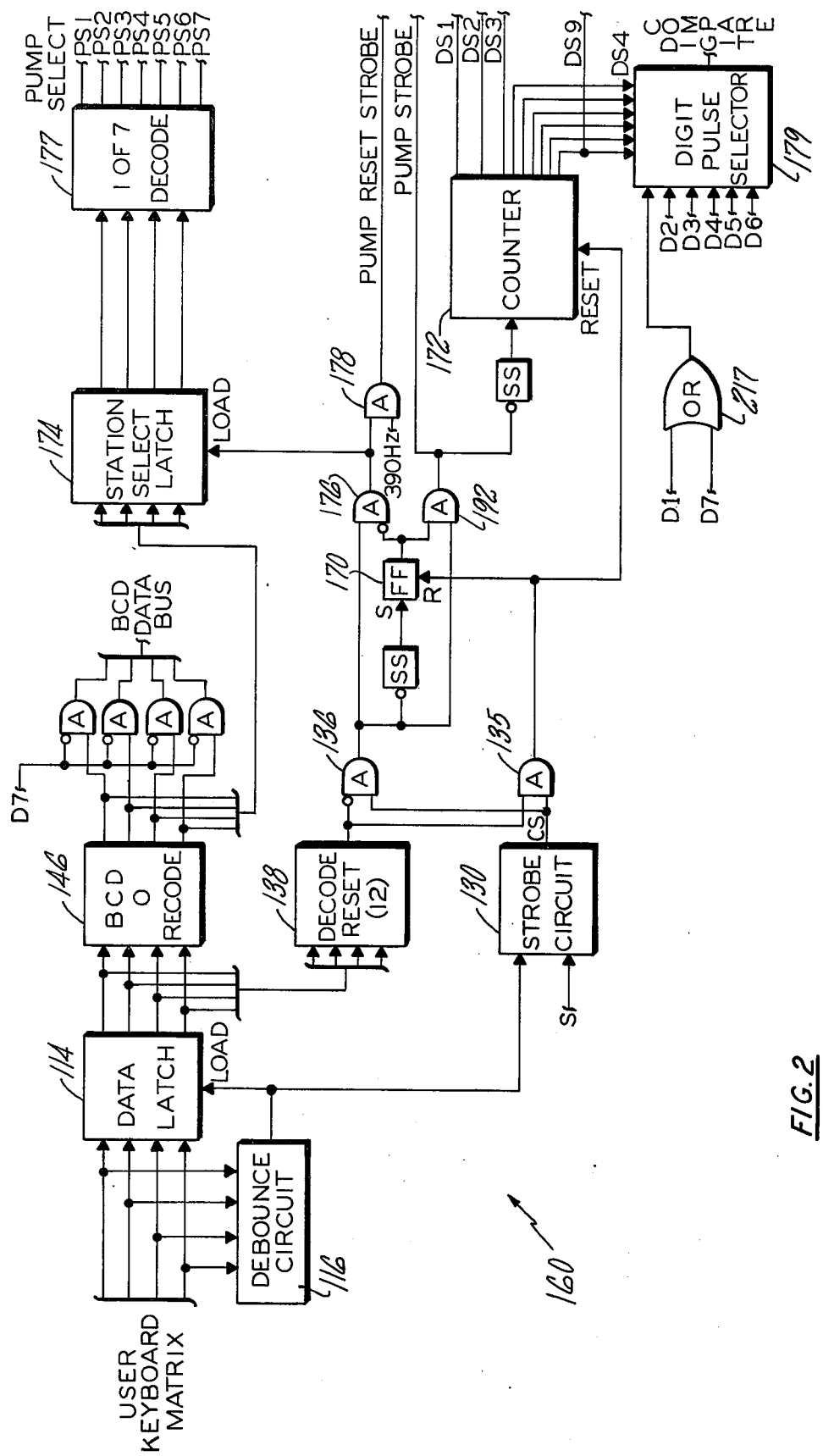
FIG. 2 is a diagrammatic representation of a user key-board circuit of the access system.

Referring to FIG. 2, a user keyboard circuit 160 is employed for keying data from the user keyboard 26 into the system for activating a selected pump. The user keyboard entry circuit functions in part like the main console entry circuit. Specifically, as described with reference to the main console entry circuit shown in FIG. 5, when a user keyboard key is depressed, a corresponding binary encoded signal is stored in a data latch 114 (for being transmitted via a BCD data bus to the selected pump circuit 12 and to the comparator 86). As described, the proper user entry procedure provides for first depressing the reset button "R" of the user keyboard 26. The produced reset signal is decoded by the reset signal decoder 138 to transmit a reset cycle strobe signal via a reset control gate 135 for resetting a flip-flop 170 and a suitable digit select counter 172 to its first or DS1 digit select position.

The succeeding number key depressed (i.e., any number key 1–7) provides for selecting the pump to be used for dispensing fuel. The resulting binary signal stored in the data latch 114 is also timely stored in a station select latch 174 by a cycle strobe signal CS from a strobe circuit 130 steered via control gates 136, 176 to load the station select latch 174. The binary signal stored in the station select latch 174 is decoded by a suitable decode circuit 177 to provide a station select signal PS1 to PS7 in the seven corresponding pump select outputs of the counter for selecting the respective pump station circuit 12. Also, a 390 Hz half-cycle pump reset strobe signal is transmitted via a pump reset control gate 178 (during the last half of the cycle strobe signal CS after the appropriate station select signal PS1 to PS7 is produced) to reset the selected pump circuit by resetting flip-flops 180, 181 and setting flip-flop 182 of the selected pump circuit (see FIG. 3).

At the end of the pump reset strobe signal, the flip-flop 170 is set to close the reset control gate 176 to prevent changing the selected pump stored in the station select latch 174 until after the reset button at the user keyboard is depressed again. The nine-digit user identification number is then entered, digit by digit in descending order sequence, via the user keyboard and data latch 114 and transmitted (via a buffer recode matrix 146 employed for recoding binary 10 to binary 0 as in the main console circuit 112) to (a) each pump circuit 12 for use in loading the first three digit numbers of the user identification number into the RAM address latches 106–108 of the selected pump circuit, and (b) the comparator 86 for use in comparing the last six digit numbers of the user identification number with the six-digit security code stored in the user storage block selected with the first three digit numbers of the user identification number. Each identification number entry signal is also employed to step the digit select counter 172 at the end of each corresponding pump strobe signal to provide digit time signals D1 to D6 in a "Digit Compare" output of a digit pulse selector 179, for the last six identifier digits respectively.

Referring to FIG. 3, the pump reset strobe signal is transmitted via a reset control gate 184 of the selected pump (established by the pump select signal—e.g., PS1 in FIG. 3) if the selected pump is not in use (i.e., if the "Status" signal of the selected pump is not present) to reset the flip-flops 180, 181 and set a flip-flop 182. Thus, if the selected pump is in use as evidenced by the presence of a "Status" signal, the selected pump circuit 12 would not be reset. Also, until the selected pump handle is turned "on" to deliver fuel, the selected pump circuit can be fully reset for entering the appropriate nine-digit user identification number, for example, if an incorrect identification number had through inadvertence been previously entered.

Each number key depressed after the station select key provides for transmitting a cycle strobe signal CS from the strobe circuit 130 via the gates 136, 192 as a pump cycle strobe signal. The pump cycle strobe signal is transmitted via a control gate 194 of the selected pump circuit to a first digit address control gate 196 and (the DS1 digit select signal is also applied to the address control gate 196) to enter the BCD amount of the first identification number key into the first or lowest order BCD address latch 106. In similar manner, the BCD amounts of the two succeeding identification number keys depressed are steered into the second and third digit latches 107, 108 via the second and third address control gates 201, 202 respectively.

The BCD outputs from the three address latches 106–108 of the selected pump circuit 12 are thereafter strobed during the corresponding station time interval (e.g., by station strobe signal T1 for Pump No. 1 as shown in FIG. 3) for addressing the RAM 76 as previously described. Also, as has been described, the first three-digit numbers entered with the user keyboard 26 (after the user keyboard circuit is reset with the "R" key and an authorized pump is selected with a succeeding number key) form the first three-digit numbers of the user's nine-digit indentification number and are stored in the address storage latches 106–108 of the selected pump for automatically addressing the RAM and selecting the user's storage block during each respective pump time interval T1–T7.

The next or fourth key digit number entered with the user keyboard 26 is compared with the first BCD digit amount of the selected storage block—i.e., at time D1 of the respective station time T1–T7 by a "Digit Compare" signal transmitted from the digit pulse selector 179 of the user keyboard entry circuit to a comparison control gate 209. Specifically, the "Digit Compare" signal is transmitted via a control gate 210 (FIG. 3) of the selected pump (as established by the pump select signal from the user keyboard circuit 160) during the respective station time interval (e.g., time interval T1 for Pump No. 1 as shown in FIG. 3) to timely test a "Compare" signal transmitted to the comparison control gate 209. If the keyed digit amount is the same as the corresponding RAM storage digit amount of the selected user storage block establishing the first digit amount of the respective user security code, the "Compare" signal from the comparator 86 will hold the gate 209 closed to prevent an unauthorization flip-flop 182 from being reset. If the keyed digit amount is not the same as the corresponding RAM digit amount, the flip-flop 182 will be reset to prevent succeeding pump authorization (via an AND gate 214 to set an authorization flip-flop 181). The next five keyed digit amounts entered via the user keyboard are similarly compared with the succeeding five RAM storage digit amounts establishing the last five-digit amounts of the user security code. And is any one of the next five keyed digit amounts are incorrect, the unauthorization flip-flop 182 will be reset to prevent pump authorization.

The established access control code number for the pump is transmitted, from a suitable BCD access control code circuit 215 of the respective pump circuit 12, to the comparator 86 during time interval D7 of the corresponding station time interval (e.g., station time interval T1 for pump station No. 1) for comparison with the access control code number entered into the seventh digit of the selected user storage block, it being seen upon reference to FIG. 2 that all amounts keyed into input data latch 114 are isolated from the BCD data bus during digit time interval D7. In the shown embodiment, the pump access control code number established by the pump circuit 215 is compared with the assigned user access control code number in RAM storage when the fourth identification code number is keyed into the entry circuit. For that reason, a D7 digit strobe signal lead is connected to the digit selector 179 to provide a D7 "Digit Compare" signal (as well an a D1 "Digit Compare" signal) during the fourth or DS4 signal output of the digit select counter 172. Thus, if the established pump access control code of the selected pump is not the same as the assigned user control code entered into the seventh digit of the selected user storage block, the unauthorization flip-flop 182 (FIG. 3) will be reset to prevent authorization.

If the correct identification number is entered and the access control code of the selected pump is the same as the assigned user access control code number, the flip-flop 182 remains set (having been set by the original pump reset signal transmitted via reset control gate 184), the last digit pump strobe signal in combination with the DS9 digit select signal will set the authorization flip-flop 181 (during time $\phi 2$ of digit time D8 of the respective pump station time) to generate an authorization signal and thereby activate the selected pump for dispensing fuel.

The authorization signal so generated is transmitted to the user console 24 to energize the corresponding pump authorization light and thereby indicate that the selected pump has been activated. A user employing the incorrect identification number becomes aware of such only by the failure of the authorization lamp to light and also by the failure of the selected pump to be activated. Thus, a user employing an incorrect identification number or selecting an unauthorized pump will not be able to determine which if any identifier digits (including the first three digits employed to select the proper user storage block and the last six digits forming the assigned security number stored in the user storage block) were incorrectly entered.

Once a pump is activated and the pump handle is turned ON to generate a "Status" signal, the RAM address entered into the address latches 106–108 cannot be changed at the user keyboard until the pump handle is turned off to thereupon reset the pump circuit 12 via the flip-flop 180. Specifically, the reset control gate 184 is held closed by the "Status" signal to prevent resetting the pump circuit while the corresponding pump is in use as established by the pump handle being in its "on" or horizontal position.

The access control code selector circuit 215 of each pump is provided as previously indicated for establishing the BCD access control code for the corresponding pump 10. For flexibility, a push button operated manually settable BCD selector such as the manually settable main console address selectors 93–95 may be used for this purpose or the access control code may be merely established by a suitable hard-wired BCD selector circuit.

Referring to FIGS. 1, 3 and 4, as previously described, after a selected pump 10 is activated and the pump computer 46 is reset by pivoting the pump handle 40 to its "on" position, the selected pump 10 is conditioned for dispensing fuel and a pulse is generated by a pump pulse generator 47 for each pre-established incremental amount of fuel dispensed (e.g., one-tenth of a gallon). Each pulse is transmitted via the pump interconnect circuit 13 (which provides for establishing a suitable pulse width) to the respective pump circuit 12 to set a pulse storage flip-flop 230 (FIG. 3). An incremental signal is then transmitted via an AND gate 232 and pulse bus 234, during the respective station time interval (e.g., station time interval T1 for Pump No. 1 as shown in FIG. 3, until a "Reply Reset" signal is applied via an AND gate 233 to reset the flip-flop 230), to a RAM input control circuit to be stored in a latch 236 (FIG. 4) at digit time D6. The increment signal is then transmitted via an AND gate 238 at digit time D8 to increment the eighth decade of the selected user storage block which is the lowest order decade of the five-decade totalizer of the storage block. (As previously described, the user storage block is originally selected by the first three-digit amounts of the nine-digit user identification number which are stored in the address storage latches 106–108 of the selected pump and thereafter employed for addressing the RAM 76 during the respective station time interval.) Specifically, the incremental signal is transmitted at time $\phi 4$ of digit time D8 to increment the count of a BCD counter 240, the existing count of the lowest order decade of the five-decade totalizer having been preset into the counter 240 at time $\phi 2$. The incremental signal is also transmitted at time $\phi 6$ as a "Write" signal for writing the incremented count of the BCD counter 240 into the lowest order decade of the totalizer. A "Reply Reset" signal is immediately thereafter generated at time $\phi 7$ to reset the pulse storage latch 230 of the respective pump circuit.

Any carry from the lowest order totalizer decade (resulting when a nine count exists in the decade before it is incremented) is sensed by a BCD nine decode circuit 244, and any carry output signal from the decode circuit 244 is clocked into a first stage carry storage flip-flop 246 at time $\phi 4$—i.e., at the same time the counter 240 is incremented. Any carry signal stored in the first stage flip-flop 246 is then clocked into a second stage storage flip-flop 248 at time $\phi 7$. The carry stored in the second stage flip-flop 248 is transmitted by the succeeding $\phi 4$ and $\phi 6$ signals, that is at time $\phi 4$ and $\phi 6$ of succeeding digit time, to increment the succeeding totalizer decade in the same manner as an original increment signal functions to increment the lowest order totalizer decade. Thus, any carry signal from any totalizer decade is transmitted to increment any succeeding higher order totalizer decade during the respective digit time interval D9 to D12. Any carry from the highest order totalizer decade (i.e., the twelfth storage block decade) is however inhibited by using the D13 digit signals to reset the carry storage flip-flops 246, 248.

Thus, a multiplexing system is provided, using the address originally stored by the user in the storage latches 106-108 for the selected fuel pump 10 to address the RAM 76 during the respective station time interval, to accumulate the amount dispensed by each user in his assigned user storage block. The total amount dispensed by each user can then be selectively registered at the main console.

Referring to FIGS. 1 and 4, a lamp test push button 260 and lamp test circuit 261 are provided for selectively applying a binary 8 to the binary input to the display register 16 for displaying an "8" with each of the LED digit displays and thereby test the operability of each of their seven bars or segments. Also, the lamp test push button 260 is connected to the user console to test the operability of the pump authorization lamps 38.

As will be apparent to persons skilled in the art, various modifications, adaptations and variations of the foregoing specific disclosure can be made without departing from the teachings of the present invention.

I claim:

1. A multiple station access control and accounting system for activation and use, by a plurality of authorized users, of a plurality of separate operating stations, each adapted to be activated for predetermined use thereof and having means for generating a train of a plurality of pulses in accordance with the amount of use thereof; the users having different assigned multiple digit identifiers, each having a multiple digit memory block address code portion and a multiple digit security code portion, for activating the operating stations for use thereof; the access control and accounting system comprising read/write memory means having an assigned multiple digit memory block for each user, corresponding to the user's assigned memory block address code, with a first multiple digit security code section for having written therein the user's assigned multiple digit security code and a second multiple digit accumulator section for accumulating a multiple digit count of the user's operating station usage; read/write memory control means selectively operable for selecting each user memory block and selectively operable for selectively reading the accumulated count of the accumulator section of the selected user memory block, for selectively incrementing the accumulated count of the selected user memory block, and for selectively writing an assigned multiple digit security code in the security code section of the selected user memory block; operating station control means for each operating station having a settable user memory block selector for operating the read/write memory control means for selecting a user memory block of the read/write memory means; controller entry means having a readout register and operable by a controller for operating the read/write memory control means for selecting each user memory block and selectively operable for operating the read/write memory control means for writing a selected multiple digit security code in the multiple digit security code section of the selected user memory block and for reading the accumulated count of the selected user memory block with the readout register; user entry means operable by each user to select an operating station and enter the user's multiple digit identifier into the access control and accounting system to set the user memory block selector of the selected operating station control means with the multiple digit memory block address code portion thereof for selecting the corresponding user memory block of the read/write memory means; and comparator means operable for comparing the security code portion of the entered user identifier with the security code stored in the selected user memory block; the selected operating station control means being operable by the comparator means to activate the corresponding operating station only if the stored and entered security codes are the same; the read/write memory control means being operable by the pulses of each operating station to increment the accumulated count in the multiple digit accumulator section of the corresponding selected user memory storage block in accordance with the number of such pulses.

2. A multiple station access control and accounting system according to claim 1 wherein the separate operating stations are product dispensing stations and wherein the pulse generating means of each product dispensing station generates a pulse for each predetermined increment of its product dispensed.

3. A multiple station access control and accounting system according to claim 2 wherein the plurality of product dispensing stations are operable for dispensing a plurality of different products, wherein each user memory block further comprises a third product availability code section for having written therein a product availability code for the respective user, wherein the read/write memory control means is selectively operable for writing a selected product availability code in the product availability code section of a selected user memory block, wherein the controller entry means is selectively operable by a controller for operating the read/write memory control means for writing a selected product availability code in the product availability code section of a user memory block selected with the controller entry means, wherein each product dispensing station control means comprises station product encoding means for establishing a product code for the respective dispensing station product, wherein the comparator means is operable for comparing the product code of the selected dispensing station control means with the product availability code in the product availability code section of the corresponding user memory block, and wherein the dispensing station control means is operable by the comparator means to activate the respective dispensing station only if the availability and station product codes are the same.

4. A multiple station access control and accounting system according to claim 2 wherein each product dispensing station has manual control means and, when activated, the manual control means is manually operable to condition the dispensing station for dispensing product and then manually operable to condition the dispensing station not to dispense product, and wherein each product dispensing station control means is connected to the respective manual control means to deactivate the product dispensing station when the manual control means is operated to condition the dispensing station not to dispense product.

5. A multiple station access control and accounting system according to claim 1 wherein the read/write memory control means comprises sequencing means for repetitively sequentially operating the operating station control means and controller entry means in a predetermined sequence for operating the read/write memory control means for selecting a user memory block.

6. A multiple station access control and accounting system according to claim 1 wherein the plurality of operating stations are fuel dispensing stations, each independently operable for dispensing fuel.

7. A multiple station access control and accounting system according to claim 1 wherein each user memory block further comprises a third station availability code section for having written therein a station availability code for the respective user, wherein the read/write memory control means is operable for writing a selected station availability code in the station availability code section of the selected user memory block, wherein the controller entry means is selectively operable by a controller for operating the read/write memory means for writing a selected station availability code in the selected user memory block, wherein each operating station control means comprises station encoding means for encoding the respective station, wherein the comparator means is operable for comparing the station availability code in the station availability code section of the selected user storage block with the station code of the corresponding dispensing station, and wherein the operating station control means is operable by the comparator means to activate the respective operating station only if the corresponding memory station availability code and encoded station code are the same.

8. A multiple station access control and accounting system according to claim 1 wherein the user entry means comprises a push button keyboard with a plurality of independently operable push buttons, encoding means for providing a different binary encoded signal for each push button, the push buttons being manually operable by each user to enter the user's multiple digit identifier, digit by digit in sequence, into the access control and accounting system to generate a train of binary encoded signals of the multiple digits respectively of the user's identifier, the selected operating station control means being operated by the binary encoded signals of the multiple digit memory block address code portion of the identifier to set the memory block selector thereof, and the comparator means being operable to sequentially compare the binary encoded signals of the multiple digit security code portion of the entered identifier with the respective digits of the security code written into the corresponding selected user memory block.

9. A multiple station access control and accounting system according to claim 1 wherein the read/write memory control means comprises multiplexing means for repetitively sequentially operating the controller entry means and plurality of operating stations control means for selecting a user memory block.

10. A multiple station access control and accounting system according to claim 9 wherein the read/write memory control means is operated by each pulse from each operating station to increment the accumulated count in the accumulator section of the corresponding user memory block during said selection of that user memory block by the corresponding operating station control means.

11. A multiple station access control and accounting system for activation and use, by a plurality of authorized users, of a plurality of fluid dispensing stations, each adapted to be activated for dispensing fluid and having means for generating a train of pulses for each predetermined increment of fluid dispensed; the users having assigned identifiers respectively which include different memory block address codes respectively; the access control and accounting system comprising read/write memory means having an assigned multiple digit memory block for each user, corresponding to the user's assigned memory block address code, with a multiple digit accumulator for storing therein the accumulated count of the user's dispensing station usage; memory control means selectively operable for selecting each user memory block and selectively operable for reading the accumulated count and incrementing the accumulated count of the accumulator section of the selected user memory block; dispensing station control means for each dispensing station having a settable user memory block selector for operating the read/write memory means for selecting a user memory block; controller entry means having a readout register and selectively operable by a controller for selectively operating the read/write memory means for selecting each user memory block and for reading the accumulated count of the selected user memory block with the readout register; user entry means operable by each user to select a fluid dispensing station and enter the user's identifier into the access control and accounting system to set the user memory block selector of the selected station control means with the memory block address code thereof for selecting the corresponding user memory block; the selected station control means being operable to activate the corresponding fluid dispensing station after entry of the user's assigned identifier; and the read/write memory control means being operable by the pulses of each fluid dispensing station to increment the accumulated count in the multiple digit accumulator of the corresponding selected user storage block in accordance with the number of such pulses.

12. A multiple station access control and accounting system according to claim 11 wherein each user identifier includes a security code portion; wherein the control and accounting system comprises security code verification means automatically operable for verifying the security code portion of the entered user identifier; and wherein the selected dispensing station control means is operated by the verification means to activate the corresponding fluid dispensing station only if the entered security code portion is verified.

13. A multiple station access control and accounting system according to claim 12 wherein each user has a multiple digit identifier with a multiple digit memory block address code portion and a multiple digit security code portion, wherein the user entry means comprises a push button keyboard with a plurality of independently operable push buttons, encoding means for providing a different binary encoded signal for each push button, the push buttons being manually operable by each user to enter the user's multiple digit identifier, digit by digit in sequence, into the access control and accounting system to generate a train of binary encoded signals of the multiple digits respectively of the user's identifier, the selected dispensing station control means being operated by the binary encoded signals of the multiple digit memory block address code portion of the identifier to set the memory block selector thereof, and the verification means being operable to sequentially verify the binary encoded signals of the multiple digit security code portion of the entered identifier.

14. A multiple station access control and accounting system according to claim 1 wherein the plurality of fluid dispensing stations are operable for dispensing a plurality of different fluid products, wherein each user memory block further comprises a product availability code section for having written therein a product availability code for the respective user, wherein the read/write memory control means is selectively operable for writing a selected product availability code in the product availability code section of the selected user memory block, wherein the controller entry means is selectively operable by a controller for operating the read/write memory control means for writing a selected product availability code in the product availability code section of a user memory block selected with the controller entry means, wherein each dispensing station control means comprises station product encoding means for establishing a product code for the respective dispensing station product, wherein the system comprises comparator means for comparing the product availability code of the selected dispensing station control means with the product availability code in the product availability code section of the corresponding selected user memory block, and wherein the dispensing station control means is operable by the comparator means to activate the respective dispensing station only if the availability and station product codes are the same.

15. A multiple station access control and accounting system according to claim 11 wherein the read/write memory control means comprises sequencing means for repetitively sequentially operating the dispensing station control means and controller entry means in a predetermined sequence for operating the read/write memory control means for selecting a user memory block.

16. A multiple station access control and accounting system according to claim 11 wherein each user memory block further comprises a station availability code section for having written therein a station availability code for the respective user, wherein the read/write memory control means is operable for writing a selected station availability code in the station availability code section of the selected user memory block, wherein the controller entry means is selectively operable by a controller for operating the read/write memory means for writing a selected station availability code in the selected user memory block, wherein each dispensing station control means comprises station encoding means for encoding the respective station, wherein the system comprises comparator means for comparing the station availability code in the station availability code section of the selected user storage block with the station code of the corresponding dispensing station, and wherein the dispensing station control means is operable by the comparator means to activate the respective dispensing station only if the corresponding memory station availability code and encoded station code are the same.

17. A multiple station access control and accounting system according to claim 11 wherein each fluid dispensing station has manual control means and, when the dispensing station is activated, the manual control means is manually operable to condition the dispensing station for dispensing product and then manually operable to condition the dispensing station not to dispense product, and wherein each dispensing station control means is connected to be operated by the respective manual control means to deactivate the dispensing station when the manual control means is operated to condition the dispensing station not to dispense product.

18. A multiple station access control and accounting system according to claim 11 wherein the read/write memory control means comprises multiplexing means for repetitively sequentially operating the controller entry means and plurality of dispensing stations control means for selecting a user memory block.

19. A multiple station access control and accounting system according to claim 18 wherein the read/write memory control means is operated by each pulse from each dispensing station to increment the accumulated count in the accumulator of the corresponding user memory block during said selection of that user memory block by the corresponding dispensing station control means.

20. An access control system operable for activation and use, by a plurality of authorized users, of at least one fluid dispensing station, each adapted to be activated for dispensing fluid; the users having different assigned multiple digit user identifiers respectively, each having a multiple digit memory block address code portion and a multiple digit security code portion, for operating the system for activation of a dispensing station; the access control system comprising station control means operable for activating each fluid dispensing station; read/write memory means having an assigned multiple digit memory block for each user, corresponding to the user's assigned memory block address code, with a multiple digit security code storage section of having written therein the user's assigned multiple digit security code; read/write memory control means selectively operable for selecting each user memory block and selectively operable for selectively writing an assigned multiple digit security code in the security code storage section of the selected user memory block; entry means operable by a controller for operating the read/write memory control means for selecting each user memory block and selectively operable for operating the read/write memory control means for writing a selected multiple digit security code in the multiple digit security code storage section of the selected user memory block; the entry means being selectively operable by each user for entering a selected input binary encoded multiple digit electrical identifier signal of a corresponding assigned multiple digit user identifier into the access control system to select the respective user memory block with the multiple digit memory block address code portion thereof; and verification means operable for verifying the correctness of the input identifier signal entered into the system by the user by comparing the multiple digit security code portion thereof with the multiple digit security code stored in the security code storage section of the selected user memory block; the verification means being operable to operate the station control means to activate at least one fluid dispensing station for use by the user if said input identifier signal entered by the user is verified to be correct.

21. An access control system according to claim 20 wherein the entry means comprises keyboard entry means with a set of a plurality of binary encoded keyboard digit keys for a plurality of different identifier digits respectively, each of the keys being independently operable for entering a corresponding input binary encoded electrical digit signal into the access control system, the entry means being operable by each user to enter an input multiple digit binary encoded electrical identifier signal of the corresponding assigned user identifier into the access control system by operating predetermined keys, for said multiple digits respectively of the assigned user identifier, in predetermined sequence.

22. An access control system according to claim 20 wherein the entry means comprises keyboard entry means selectively operable for selectively operating the binary signal identifier means for establishing therewith a selected multiple digit identifier signal, digit by digit in a predetermined sequence, for establishing each said different assigned user identifier, and operable by each user for entering an input multiple digit assigned user identifier signal, digit by digit in a predetermined sequence, into the access control system.

23. An access control system operable for activation and use, by a plurality of authorized users, of at least one fluid dispensing station, each adapted to be activated for dispensing fluid; the users having at least one assigned user identifier for operating the system for activation of a dispensing station; the access control system comprising station control means operable for activating each fluid dispensing station; identifier means selectively operable for establishing therewith a selected binary encoded electrical identifier signal for establishing each corresponding assigned user identifier; entry means selectively operable by each user for entering a selected input binary encoded electrical identifier signal of a corresponding assigned user identifier into the access control system; verification means operable for verifying the correctness of the input identifier signal entered into the system by the user by comparing it with a corresponding user identifier signal established with the identifier means; the verification means being operable to operate the station control means to activate at least one fluid dispensing station for use by the user if said input identifier signal entered by the user is verified to be correct; each of the said established and said input identifier signals being a multiple digit identifier signal which corresponds to a multiple digit assigned user identifier; the identifier means and entry means being selectively operable for establishing and entering respectively each of a plurality of different selected multiple digit binary encoded electrical identifier signals, for different corresponding multiple digit assigned user identifiers respectively, for the plurality of authorized users respectively; and each fluid dispensing station having means for generating a train of a plurality of pulses with a pulse for each predetermined increment of fluid dispensed; the access control system further comprising accumulator memory means with an assigned user accumulator section for each authorized user for accumulating a count of the amount of fluid dispensed by the respective user, and memory control means selectively operable for selecting each user accumulator section and for incrementing the accumulated count of the selected user accumulator section; the identifier means comprising selector means selectively settable by the input user identifier signal for operating the memory control means for selecting a user accumulator section of the accumulator memory means in accordance with the input identifier signal, the memory control means being operable by the selector means to select a user accumulator section corresponding to the input user identifier signal for incrementing the accumulated count thereof with the pulses generated by each activated fluid dispensing station of the user.

24. An access control system according to claim 23 wherein the selector means comprises at least one memory address selector with a plurality of binary encoded electrical signal latches selectively settable for selectively operating the memory control means for selecting each user accumulator section; and wherein the entry means is selectively operable for selectively setting the latches with the user's identifier signal for establishing corresponding binary encoded electrical signals therewith respectively for selecting the corresponding assigned user accumulator section, each memory address selector being operable to operate the memory control means to select the corresponding assigned user accumulator section for incrementing the accumulated count thereof with the pulses generated by each activated fluid dispensing station of the user.

25. An access control system according to claim 24 for a plurality of said fluid dispensing stations, and wherein said selector means comprises a plurality of said memory address selectors for concurrent fluid dispensing from a plurality of the fluid dispensing stations by a plurality of authorized users.

26. An access control system according to claim 24 wherein the plurality of signal latches of each memory address selector are digit signal latches of ascending order respectively, each settable for establishing a binary coded signal therewith, and are connected for collectively operating the memory control means for selecting each user accumulator section, wherein the entry means is operable by a user for individually setting each digit latch with a corresponding digit signal of the user's input multiple digit identifier signal for establishing a selected binary coded signal therewith; wherein one lower order latch is a BCD latch with binary 1, 2, 4, 8 output signal leads and the adjacent higher order latch is an octal latch with binary 1, 2, 4 output signal leads and wherein the binary 1 signal lead of said lower order BCD latch is combined with the binary 1, 2, 4 signal leads of said adjacent higher order octal latch to collectively provide a four lead binary signal range with a binary output signal for operating the memory control means for selecting a bank of said accumulator sections of the accumulator memory means.

27. An access control system according to claim 23 further comprising register readout means and wherein the entry means is selectively operable to operate the memory control means to select each accumulator section of the accumulator memory means and register the accumulated count therein with the register readout means.

28. An access control system for activation and use, by a plurality of authorized users, of a plurality of fluid dispensing stations, each adapted to be activated for dispensing fluid; the users having at least one assigned user identifier for operating the access control system for activation of the fluid dispensing stations for dispensing fluid; the access control system comprising station control means selectively operable for selectively activating the fluid dispensing stations; binary signal identifier means selectively operable for establishing therewith a selected binary encoded electrical identifier signal for establishing each assigned user identifier; resettable entry means selectively operable to selectively operate the binary signal identifier means to establish therewith a selected binary encoded electrical identifier signal for establishing each assigned user identifier, the entry means being selectively operable by each user to sequentially reset the entry means, select a dispensing station and enter an input binary encoded electrical identifier signal, for the corresponding assigned user identifier, into the access control system; the entry means comprising a push button keyboard with a reset push button connected for resetting the entry means and a plurality of additional push buttons connected for both selecting a dispensing station and entering an input binary encoded electrical identifier signal digit by digit in sequence, and verification means for comparing the input identifier signal with the binary encoded electrical identifier signal established with the identifier means for the assigned user identifier and for operating the station control means for activating the selected fluid dispensing station if the input and established identifier signals are the same.

29. An access control system for activation and use, by a plurality of authorized users, of a plurality of fluid dispensing stations, each adapted to be activated for dispensing fluid and having means for generating a train of electrical pulses with a pulse for each predetermined increment of fluid dispensed; the access control system comprising station control means selectively operable for selectively activating each fluid dispensing station; memory means with an assigned user accumulator section for each authorized user for accumulating a count of the amount of fluid dispensed by the respective user; memory control means selectively operable for selecting each user accumulator section and for incrementing the accumulated count of the selected user accumulator section; accumulator selector means selectively settable for selectively operating the memory control means for selecting each user accumulator section of the accumulator memory means; entry means selectively operable by each user to select a dispensing station and selectively set the selector means for selecting the corresponding user accumulator section; the selector means being operable in accordance with the setting thereof to operate the memory control means to select the corresponding user accumulator section for incrementing the accumulated count thereof with the electrical pulses generated by the fluid dispensing station selected by the user.

30. An access control system according to claim 29 wherein the accumulator selector means comprises a plurality of accumulator selectors, each independently selectively settable by selective operation of the entry means for selecting each user accumulator section; the station control means providing said selective activation of each of the plurality of fluid dispensing stations for concurrent dispensing of fluid thereby by a plurality of authorized users respectively.

31. An access control system according to claim 30 wherein the memory control means comprises multiplexing means for sequentially selecting the user accumulator sections with the plurality of selectors respectively, for incrementing the accumulated counts of the user accumulator sections with the electrical pulses generated by the fluid dispensing stations selected by the users respectively.

32. An access control system according to claim 29 wherein the entry means comprises keyboard entry means with a plurality of keys for selectively setting each of the plurality of accumulator selectors.

* * * * *

UNITED STATES PATENT OFFICE
CERTIFICATE OF CORRECTION

Patent No. 4,034,193　　　　　　　　Dated July 5, 1977

Inventor(s) James J. Jackson

It is certified that error appears in the above-identified patent and that said Letters Patent are hereby corrected as shown below:

Column 3, line 52, wherein the word "speed" should be --spaced--;

Column 8, line 65, wherein "0" should be --0--;

Column 9, line 43, wherein "six decades" should be --six storage decades--;

Column 12, line 22, wherein the word "is" should be --if--;

Column 12, line 46, wherein "user control" should be --user access control--;

Column 13, line 37, wherein the word "incremental" should be --increment--;

Column 13, line 54, wherein the word "incremental" should be --increment--

Column 13, line 58, wherein the word "incremental" should be --increment--; and

UNITED STATES PATENT OFFICE
CERTIFICATE OF CORRECTION

Patent No. 4,034,193  Dated July 5, 1977

Inventor(s) James L. Jackson

It is certified that error appears in the above-identified patent and that said Letters Patent are hereby corrected as shown below:

Claim 14, Column 18, line 17, wherein "claim 1" should read -- claim 11 --.

Signed and Sealed this

Fourth Day of April 1978

[SEAL]

Attest:

RUTH C. MASON
*Attesting Officer*

LUTRELLE F. PARKER
*Acting Commissioner of Patents and Trademarks*